United States Patent
Bode et al.

[19]

[11] Patent Number: 5,873,165
[45] Date of Patent: Feb. 23, 1999

[54] TRUCK CAB AND BOX MARRYING AND DECKING APPARATUS AND METHOD

[75] Inventors: Stephen R. Bode; Donald R. Hollaway, both of Kansas City, Mo.

[73] Assignees: K.C. Industrial Constructors, Inc., Kansas City, Mo.; Ford Global Technologies, Inc., Dearborn, Mich.

[21] Appl. No.: 628,150

[22] Filed: Apr. 4, 1996

[51] Int. Cl.⁶ .................................................. B23P 15/00
[52] U.S. Cl. ........................ 29/897.2; 198/465.1; 29/429; 29/771; 29/823
[58] Field of Search .................................. 29/897.2, 720, 29/721, 771, 822, 823, 429; 198/465.1, 465.3, 465.2; 296/183, 203

[56] References Cited

U.S. PATENT DOCUMENTS

| | | | |
|---|---|---|---|
| 4,473,935 | 10/1984 | Tatsuura et al. | 198/465.1 |
| 4,667,866 | 5/1987 | Tobita et al. | 228/4.1 |
| 4,723,356 | 2/1988 | Sakamoto et al. | 29/720 |
| 4,734,979 | 4/1988 | Sakamoto et al. | 29/720 |
| 4,802,616 | 2/1989 | Naruse et al. | 228/4.1 |
| 4,815,190 | 3/1989 | Haba, Jr. et al. | 198/465.1 |
| 4,934,507 | 6/1990 | Blocker | 198/465.3 |
| 4,951,802 | 8/1990 | Weissgerber et al. | 198/465.1 |
| 4,964,497 | 10/1990 | Bundo et al. | 29/429 |
| 4,991,707 | 2/1991 | Alexander et al. | 198/346.1 |
| 5,011,068 | 4/1991 | Stoutenburg et al. | 228/4.1 |
| 5,123,161 | 6/1992 | Kubo et al. | 29/822 |
| 5,141,093 | 8/1992 | Alexander | 198/345.1 |
| 5,165,164 | 11/1992 | Kubo et al. | 29/784 |
| 5,203,073 | 4/1993 | Kotake et al. | 29/771 |
| 5,409,158 | 4/1995 | Angel | 228/182 |
| 5,577,597 | 11/1996 | Kakida et al. | 198/465.1 |

*Primary Examiner*—Larry I. Schwartz
*Assistant Examiner*—Marc W. Butler
*Attorney, Agent, or Firm*—Wm Bruce Day; Raymond L. Coppiellie

[57] ABSTRACT

A pickup truck cab and box marrying and decking system for vehicle assembly plants is adapted to newer style pickup trucks in which portions of the box front end extend forwardly to wrap around the back corners of the cab to provide a flowing appearance. The disclosed system lifts the cab and box sections off skids on a first conveyor and transfers them to over a second conveyor bringing in a chassis frame. Measurement devices determine the position of locating fixtures on the frame. The cab and box sections are then brought together, or married, and are precisely aligned with the frame locating fixtures. The cab and box sections are then lowered to deck the married sections on the frame in precise alignment with the locating fixtures.

1 Claim, 5 Drawing Sheets

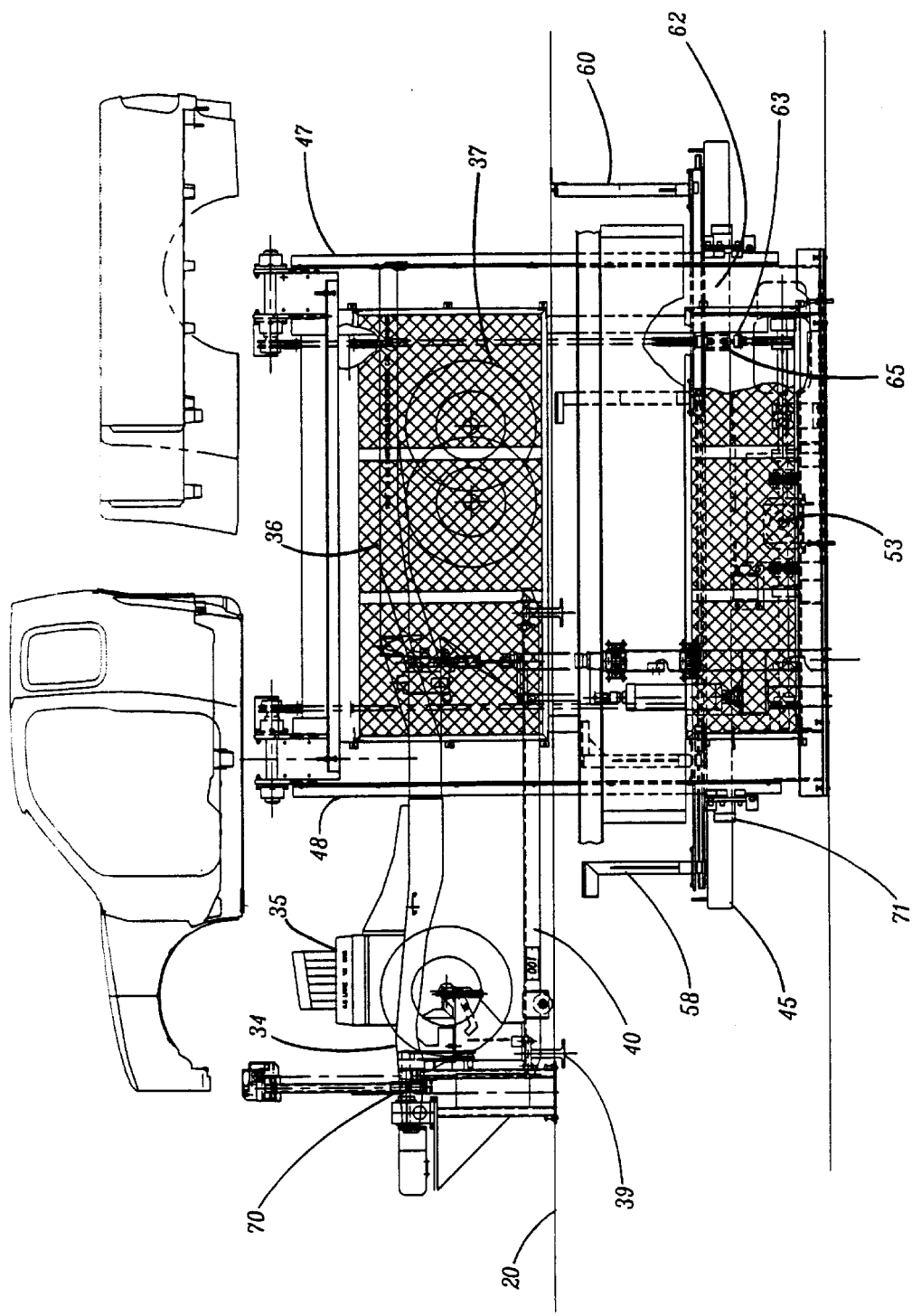

TRUCK CAB AND BOX MARRYING AND DECKING APPARATUS AND METHOD

FIELD OF THE INVENTION

The present invention relates to a system for assembling pickup truck cabs and beds on an assembly line. The present invention more particularly relates to an apparatus which brings separate sections together and decks them onto a vehicle chassis.

DESCRIPTION OF THE PRIOR ART

Decking machines are well known for lowering and positioning a vehicle body upon a rolling chassis. Decking machines are incorporated in the conveyor line operation of an automobile assembly plant and have long been used to remove a vehicle body from a body conveyor line, transport it as necessary, and lower or deck the body on the chassis frame, which commonly arrives on a second conveyor line.

With evolution of more flowing designs for pickup trucks, particular problems have arisen in the assembly line because the truck cab and truck box have normally been decked onto the chassis frame in separate operations. In other words, the cab is first decked to the frame and then the truck box is lowered into place. With pickup trucks having square design boxes, the box can be easily lowered and positioned thereafter.

With the new design pickup trucks, the decking situation is significantly more complicated, for these new designs often incorporate wraparound configurations between the front of the pickup truck bed and the rear corners of the cab. The front corners of the pickup truck bed are designed for a smooth-flowing appearance and project forwardly from the front wall of the pickup truck bed and into matching recesses in the rear corners of the cab section. This means that the observer cannot, from the side of the pickup truck, see a distinct and spaced box section from the cab section. The new designs offer particular decking difficulties because no longer can the assembler first position the truck cab on the chassis frame and then lower and deck the truck bed.

The present invention resolves the problems associated with assembly of pickup truck cabs and box sections for these new designs.

SUMMARY OF THE INVENTION

An object of the present invention is to provide a vehicle cab and box marrying and decking system in which the cab and box sections are joined or married and then mounted to a chassis frame. Another object is to marry the truck cab and box portions so that they can be precisely fitted upon a chassis frame.

According to the present invention, there is provided an apparatus for assembling a truck or vehicle body at an assembly station. The apparatus includes a first conveyor means for inwardly conveying separate cab and box sections respectively mounted on independent skids, the skids being linearly aligned. A deskid lift means Efts the cab and box sections off their respective skids and a transfer means transfers the cab and box sections from the first conveyor to over a second conveyor. The second conveyor means inwardly conveys a chassis frame. Loader lift means receives the cab and box sections from the transfer means and positions the cab and box sections precisely above the mounting fixtures on the chassis frame. The loader lift means is operable to marry the cab and box sections and subsequently lower and deck the cab and box sections onto the chassis frame, all in registration with the fixtures on the chassis frame.

A method according to the present invention assembles a truck body at an assembly station, the method comprising positioning a cab and box section on respective independent skids so that the skids are linearly aligned on a first conveyor. The cab and box sections are lifted off their respective skids by deskid lift arms which then lower the cab and box sections and deposit them upon transfer arms. The transfer arms transfer the cab and box section over a second conveyor which delivers a chassis frame. The method then lowers the cab and box sections onto loader lift arms which marry the cab and box sections together by moving the loader lift arms respectively holding the cab and box sections. The loader lift arms then lower and deck the married cab and box sections onto the chassis frame.

Other objects and advantages of the present invention will become apparent from the following drawings and description of the preferred embodiment.

BRIEF DESCRIPTION OF THE DRAWINGS

FIG. 5 is an end elevational view of the marrying and decking station.

DETAILED DESCRIPTION OF THE PREFERRED EMBODIMENT

The present invention is described in connection with a preferred embodiment and with reference to the accompanying drawings.

Figure 1:
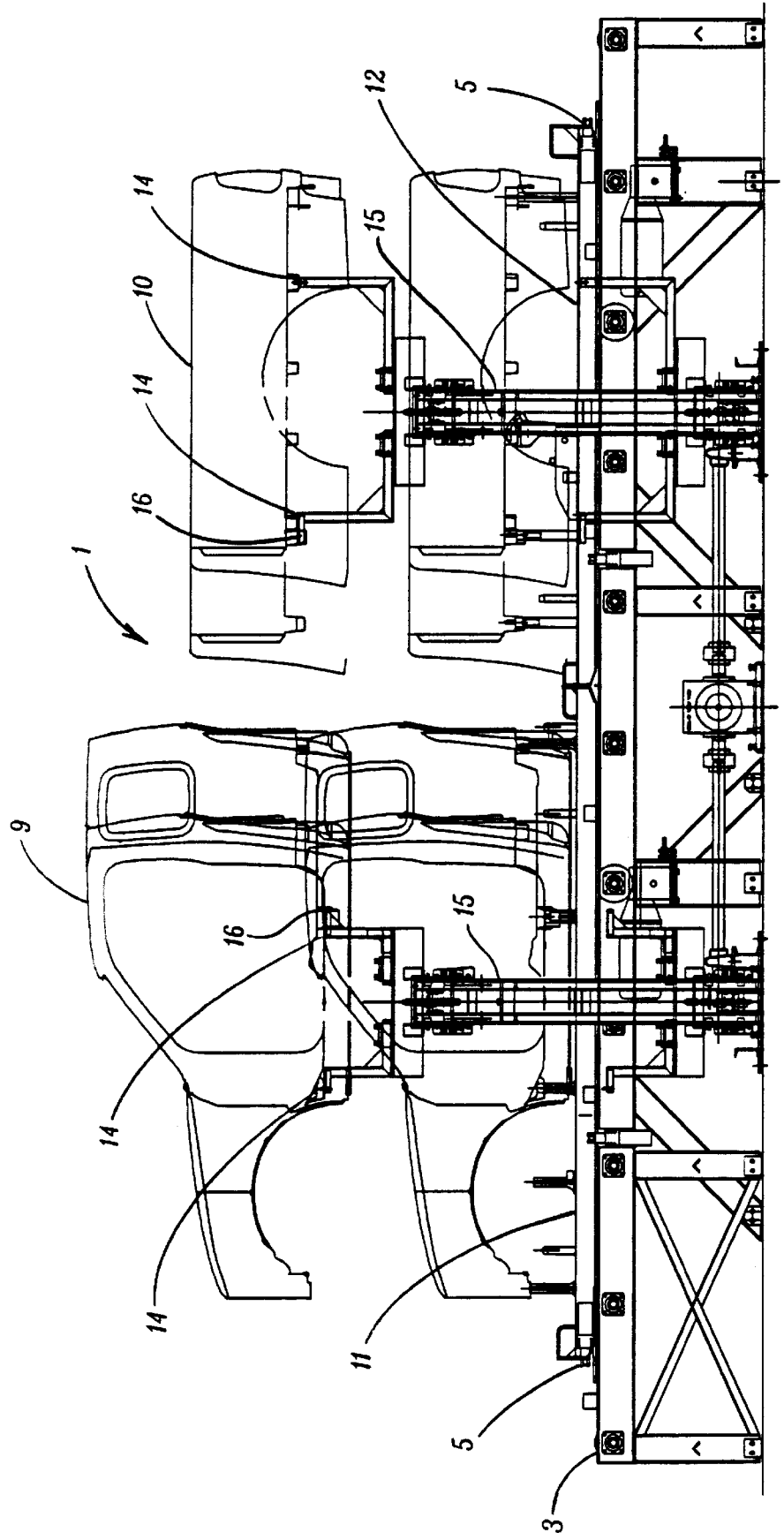
FIG. 1 is a side elevational view of an inbound conveyor system conveying a truck cab on box on separate skids and arriving at a deskid table mechanism.

The reference numeral 1, FIG. 1, generally designates an apparatus for assembling a truck body. The apparatus 1 generally includes a first conveyor station 3 carrying truck cab and box sections on separate skids, a linear transfer section 4, FIG. 3, removing the truck cab and box sections from the first conveyor station 3 and moving them to a marrying and decking station 6, FIG. 3. Each of these major components is discussed in more detail below. The apparatus 1 would normally be placed within an automotive or a vehicle assembly plant and is at the junction point between two major component conveyors, an inbound conveyor carrying truck cab and box sections and a second inbound conveyor carrying a chassis frame, normally partially assembled so as to carry engine and running gear components. The present system involves combining the cab and box and properly positioning them on the chassis frame.

Figure 2:
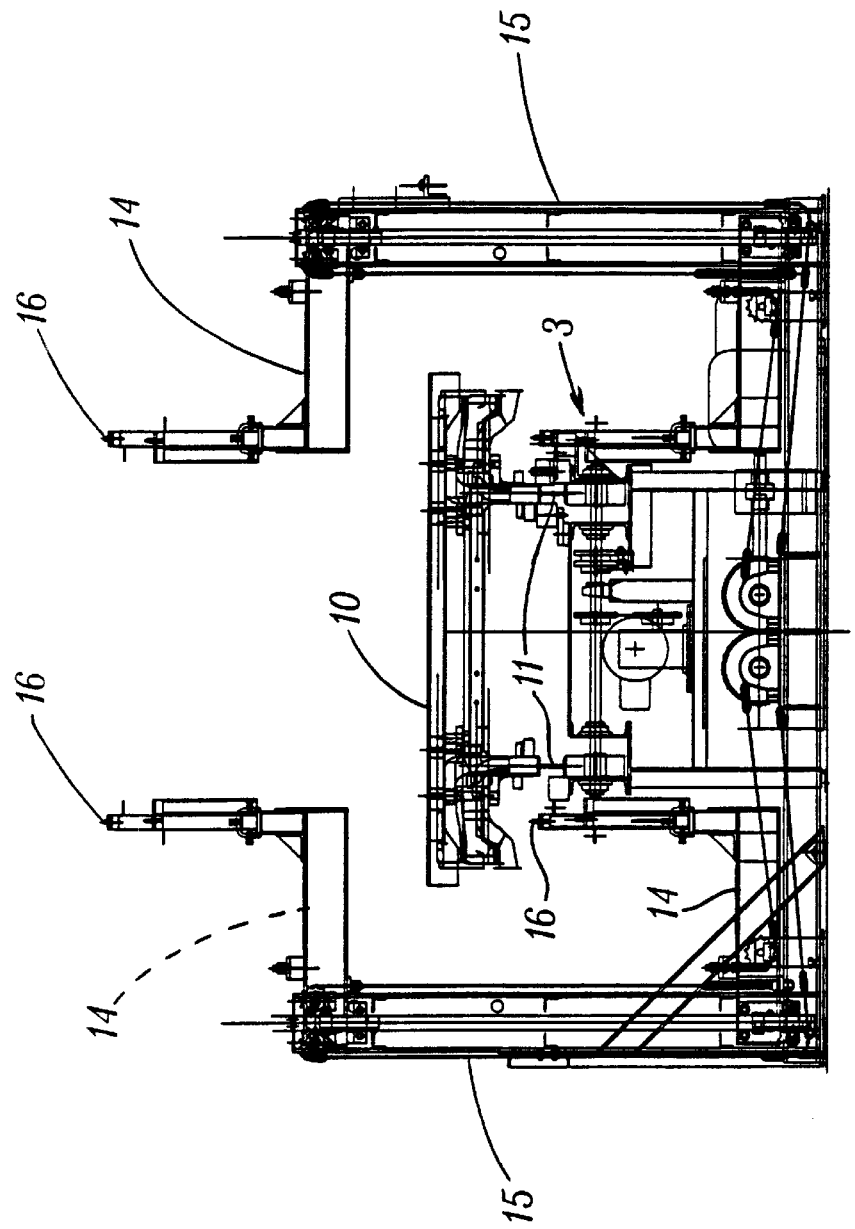
FIG. 2 is an end elevational view of inbound conveyor system and deskid table mechanism shown in FIG. 1.
Figure 3:
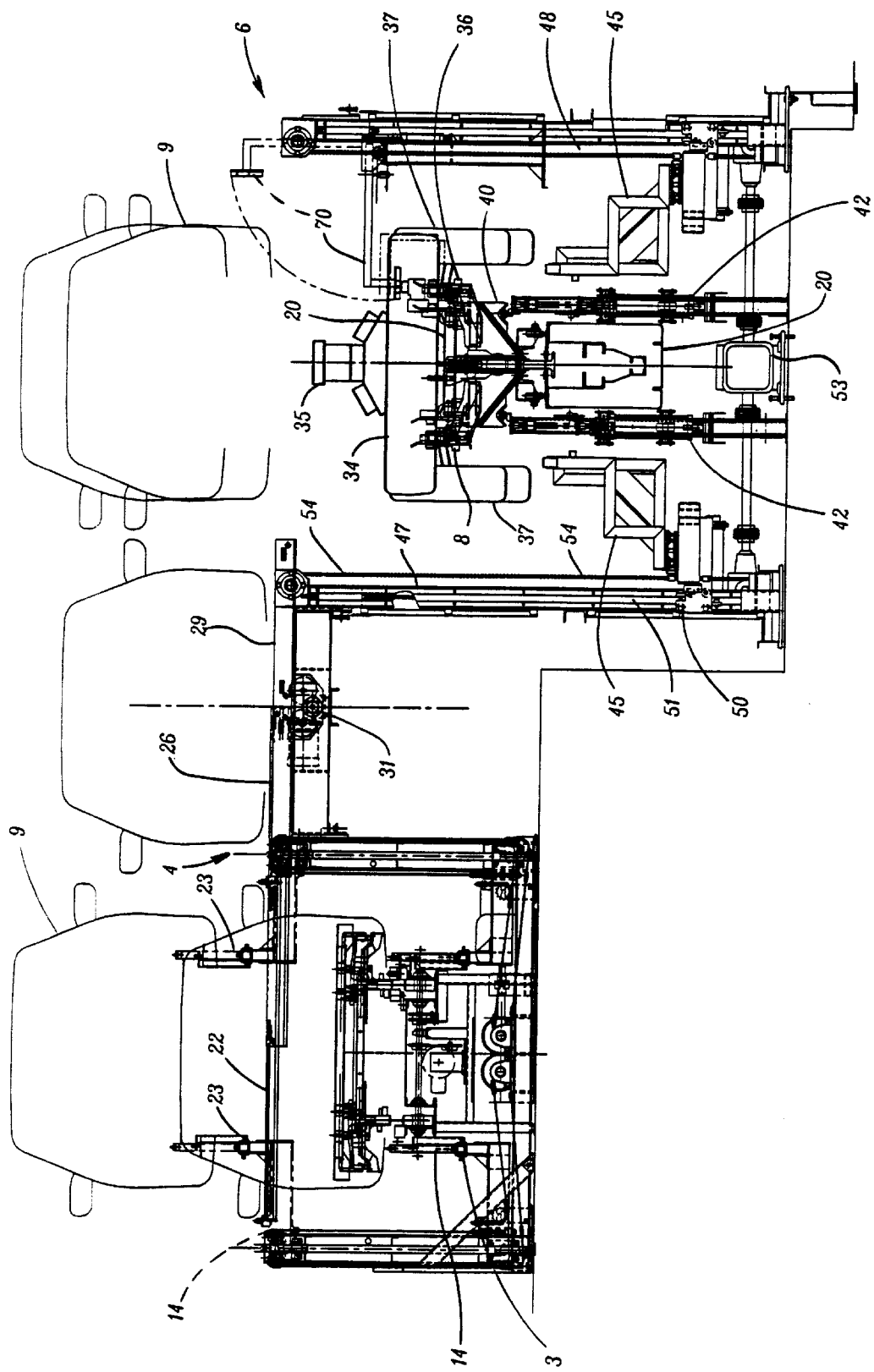
FIG. 3 is an end elevational view of the inbound conveyor system and deskid table mechanism adjoining a marrying and decking station, with a transfer arm mechanism therebetween.
Figure 4:
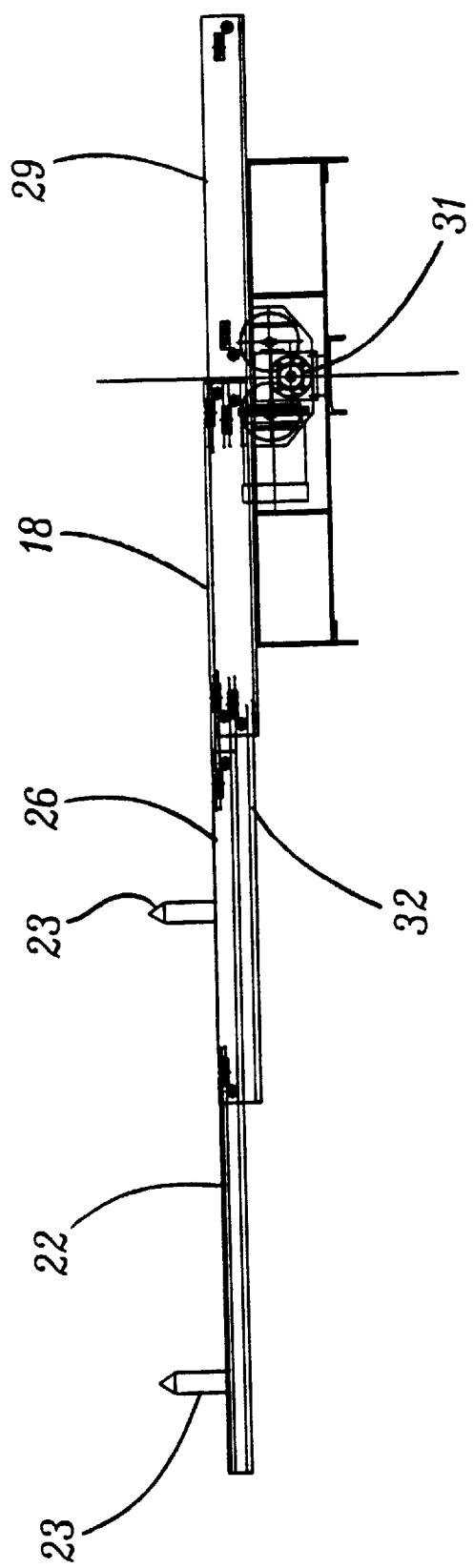
FIG. 4 is a fragmentary view of the transfer arm mechanism.

First turning to the first conveyor station 3, FIGS. 1 and 3 disclose inbound conveyor 3 which conveys a truck cab 9 and a truck bed or box 10, each mounted on separate skids, respectively 11 and 12, which are particularly configured to the truck cab 9 and truck bed 10 to be conveyed. Position sensors 5 on the inbound conveyor 3 sense and stop movement of the skids 11 and 12 as required. The first conveyor station 3 is a deskid station in that it includes deskid table lift arms 14 which raise the truck cab 9 and truck bed 10 off their respective skids 11 and 12 so that the linear transfer section 4 may remove the cab and bed 9 and 10 to the marrying and decking station 6. In the illustrated example, deskid table lift arms 14 are moved upwardly by motive means 15, such as an electric chain lift, and include locating pins 16 attaching to body reference points. The deskid table lift arms 14 raise the cab and bed 9 and 10 to an elevation such that a linear fork transfer mechanism 18, FIGS. 3 and 4, positions under the cab and bed 9 and 10 from the skids 11 and 12. The cab 9 and bed 10 is lowered by the deskid table lift arms 14 onto the linear fork transfer mechanism 18. The linear fork transfer mechanism 18 includes a three-stage fork assembly including a top fork 22, which includes locating fingers 23 for engagement with fixture holes in the truck cab 9 and truck bed 10, an intermediate fork 26, FIG. 2, connected to the top fork 22 by chains, and a base fork 29, FIG. 1. Each fork is interconnected to each other, FIG. 4, and is driven in lateral movement by a drive 31 consisting of an electrical motor with appropriate gears driving a rack 32 and causing movement of the top fork 22 and intermediate fork 26. The truck cab 9 and truck bed 10 are mounted on the top fork 22 by locating fingers 23, FIG. 3, and travel from over the inbound conveyor 3, left to right, to position over the chassis frame delivery conveyor 20, FIG. 3. FIG. 5 shows a chassis delivery conveyor 20 carrying a chassis frame 34 consisting of an engine 35, support framework 36, and tires 37. The chassis delivery conveyor 20, FIG. 3, consists of an inverted power and free system in which the chassis frame 34 travels on an inverted power and free carrier 40. Once the frame 34 is stopped on the inverted power and free carrier 40, the carrier 40 is accurately positioned fore and aft via positioners (not shown), FIG. 5. The positioner 39, of the inverted power and free carrier 40, positions the carrier 40, FIG. 5, left and right, or along x and y axes so that the chassis frame 34 is accurately positioned in both horizontal planes. Once positioned, the inverted power and free carrier 40 is stabilized. After positioning where desired in both x and y horizontal planes, the inverted power and free carrier 40 is maintained in position by a carrier stabilizer 42 consisting of extensible members which raise the chassis frame 34 and carrier 40, FIG. 3. The chassis stabilizer 42 eliminates rotational twisting in order to align the chassis frame 34 with the truck cab 9 and truck bed 10 elevated over the chassis frame 34.

After the chassis frame 34 is in position and is stabilized by the carrier stabilizer 42, and the truck cab and bed 9 and 10 are positioned on the linear fork transfer mechanism 18 above the frame 34 in the marrying and decking station 6. Decking loader lift carriages 45 raise upwardly on both sides of the chassis frame 34, FIG. 3, and stop upward movement prior to reaching the cab and bed 9 and 10. The lift carriage 45 is guided vertically for precise orientation along decking loader columns 47 and 48 by roller bearings 50 riding on hardened wear bars 51. The two lift carriages 45 are driven by a single lift drive 53 through a gear train and chain 54 arrangement. The lift carriages 45 consist of a separate cab fixture 58 and a box fixture 60 each matched to be received in fixtures on the according truck cab or bed 9 or 10. The cab 9 and bed 10 are conveyed on independent skids 11 and 12 through the deskid station and onto the linear fork transfer mechanism 18 with extra spacing between the skids 11 and 12. After the lift carriages 45 have stopped their upward raising, the cab and box fixtures 58 and 60 are precisely positioned to a "home" position below the cab 9 and bed 10 with locating pins mounted on the fixtures aligning to master body holes in the cab and bed 9 and 10. Once in position, the loader lift carriages 45 raise and lift the cab 9 and bed 10 off the linear fork transfer top fork 22 to an elevation to clear fixtures on the linear fork transfer mechanism 18. The cab 9 and box 10 are then raised to a full up position and the linear fork transfer mechanism 18 retracts from under the cab 9 and bed 10 with the linear fork transfer mechanism 18 ready to receive the next cab and box combination.

Various cab and box body length variations are manufactured and require different wheel base centers or distances between the tires based upon the cab and box length dimensions. Prior to and during positioning in the decking station, FIG. 5, the chassis frame 34 wheel base centers are verified against the build specification sheet, or computer readout, for the cab 9 and box 10 to be assembled. After verifying cab and box length information, the loader lift carriages 45 retract and the box is "married" behind the cab 9, or precisely positioned there behind in close contact to the precise cab and body tolerances for "decking" or loading on the chassis frame 34. Marrying is accomplished with the bed 10 mounted on lift carriages box fixtures 60 driven forwardly by appropriate means. In the illustrated example, the driving means include a longitudinal servo motor 62 driving a spur gear 63 to a gear rack 65 mounted on the lift carriage box fixture 60. The servo motor 62 is used to precisely program linear travel distances for the various cab and box length combinations, provide a feedback capability to verify travel distances and provide a means to electronically tie both carriages on either loader lift carriage 45.

Once the truck bed 10 is properly positioned behind the truck cab 9, the married cab/bed combination is ready to be lowered down and be decked onto the chassis frame 34. To achieve accuracy and repeatability of decking the cab box onto the chassis 34, the precise location of the chassis frame 34 within a horizontal x/y plane is determined. Automotive assembly utilizes a master locating or mounting bolt on the chassis, termed the "F" bolt, located on the driver side front section. With the cab 9 and box 10 accurately positioned and conveyed as set forth above, the corresponding "F" mount hole in the cab 9 is constantly positioned in a datum "home" position while supported by the loader lift carriage 45. The datum home cab position, is vertically transferred down to the chassis frame 34, shows any horizontal plane x-y misalignment with the chassis frame "F" mount bolt. To determine the horizontal x-y misalignment, an "F" mount detection unit 70, FIG. 3, is used. The "F" mount detection unit 70 is a laser alignment tool and includes appropriate and well-known means to rotate downwardly and place in x and y direction two laser micrometers around the "F" mount bolt. The laser micrometers detect and calculate the horizontal x and y chassis offset distances of the "F" mount from the transfer datum home position of the cab 9. Once the precise locations of the "F" mount are determined, the "F" mount detection unit 70 rotates up from the chassis frame 34 and out of the way. Appropriate computer programs are tied to the readings of the detection unit 70 to transfer the horizontal x-y offset distances determined from the "F" mount detection unit 70. For any longitudinal and lateral movement necessary, the cab and box fixtures 58 and 60 are electronically tied together and move with a servo fore/aft motor 62, cab fore/aft servo drive 71 and box/cab lateral servo drive 72. After the cab and box have obtained the proper horizontal x-y offset distance and are aligned with the chassis frame 34, the loader lift carriages 45, carrying the cab and bed 9 and 10 are lowered downwardly and deck the cab and bed onto the frame 34. The loader lift carriages 45 continue downwardly to clear the completed truck assembly. After the loader lift carriages 45 are fully retracted downwardly, the carrier stabilizers 42 retract downwardly from the chassis frame 34 and the inverted power and free carrier 40 is free to move the completed truck to the next work station. As the completed truck exits the decking station, the next chassis frame 34 enters the decking station 6 with the next decking cycle ready to repeat.

Although this invention has been described in various forms, the invention is not limited thereto except insofar as set forth in the following claims.

What is claimed and desired to be secured by Letters Patent is as follows:

1. An apparatus for assembling a truck cab and box at an assembly station comprising:
   a) first conveyor means conveying cab and box sections on respective independent skids so that said skids are linearly spaced and aligned;
   b) deskid lift means including deskid lift arms for lifting said cab and box sections off their respective skids;
   c) transfer means for transferring said cab and box sections over to a second conveyor means inwardly conveying a chassis frame;
   d) loader lift means including loader lift arms for receiving said cab and box sections from said transfer means;
   e) sensor means for determining the position of fixtures on said chassis frame; and
   f) means for moving the loader lift arms linearly together to join said cab and box sections in minimally spaced, married, relationship;
   g) said loader lift means operable for lowering and decking said cab and box sections onto said chassis frame, all in registration with said fixtures on said chassis frame.

* * * * *